Dec. 12, 1972   E. M. MARWELL ET AL   3,706,036
ELAPSED TIME COMPILING SYSTEM
Filed Jan. 7, 1970   3 Sheets-Sheet 2

INVENTORS
EDWARD M. MARWELL
EUGENE P. FINGER
BY
Pennie, Edmonds,
Morton, Taylor & Adams
ATTORNEYS

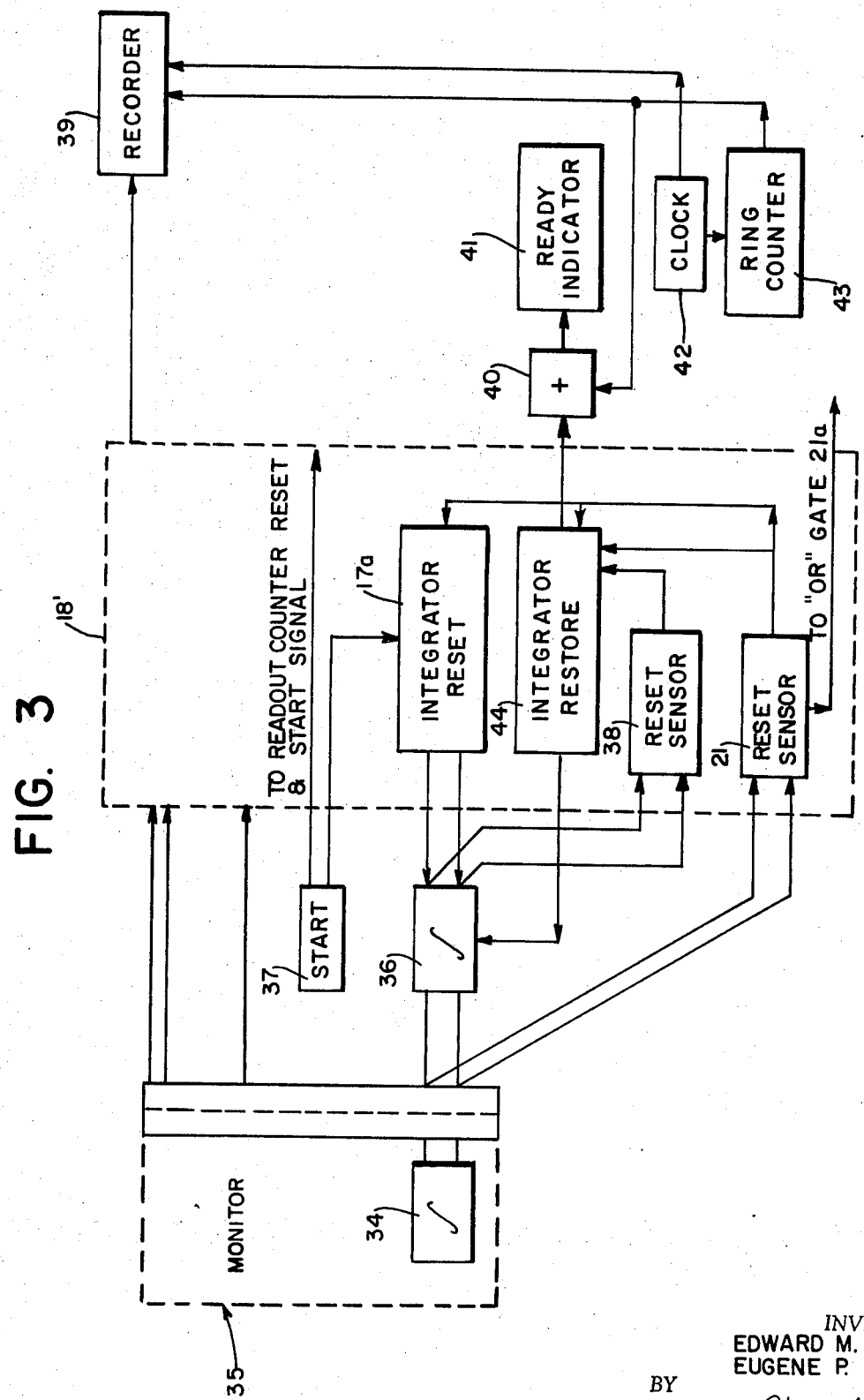

United States Patent Office 3,706,036
Patented Dec. 12, 1972

3,706,036
ELAPSED TIME COMPILING SYSTEM
Edward M. Marwell, Mount Kisco, and Eugene P. Finger, Brewster, N.Y., assignors to Curtis Instruments, Inc., Mount Kisco, N.Y.
Filed Jan. 7, 1970, Ser. No. 1,155
Int. Cl. G04f 9/00
U.S. Cl. 324—181
8 Claims

ABSTRACT OF THE DISCLOSURE

An elapsed time compiling system is described which includes elapsed time monitors, each for measuring the amount of use of an item of equipment, and a compiler for sequentially reading and storing output signals from each such monitor along with an identification signal representing the particular equipment item to which it corresponds. In a preferred embodiment, the reading of each output signal by the compiler resets the monitor to zero, thereby completely preventing error arising from reading the same monitor more than once.

BACKGROUND OF THE INVENTION

It is desirable in most industries utilizing mechanical or other types of equipment, to measure the actual use made of each item of equipment. Only in this way can economic utilization of equipment be assured. This is particularly true in factories and production facilities, where numerous items of machinery are required as well as in research facilities maintaining large amounts of sensitive scientific equipment. Calibration and servicing of such equipment can usually be performed most economically on the basis of hours of use, rather than at fixed intervals which do not necessarily correspond to elapsed operating time.

At one time, the usage of equipment items was only roughly estimated, since the costs of obtaining accurate use information outweighed the benefits of such information. Beginning in the late 1950's, certain electrochemical elapsed time indicators came into use which permitted more accurate monitoring of equipment usage. These indicators, which are coulometers, are attachable to individual equipment items, and either visually or electrically indicate the accumulated time which the particular equipment items have spent in actual use. One such device is described in U.S. Pat. No. 3,045,178 issued July 17, 1962.

Coulometric elapsed time indicators may for the purpose of this description be divided into two classes: those which are capable of non-destructive readout, and those which are not. Non-destructive readout refers to the capability of an elapsed time indicator to be read, visually or electrically, without eradicating the elapsed time value stored in it.

Current practice in business establishments using coulometric or similar elapsed time indicators is to periodically read the elapsed time from each equipment item, manually transcribe it in a ledger or on computer punch cards, and either manually or by machine to compile use records for all items of equipment. To the extent that compilation and computation of such records require human intervention, substantial errors can be introduced. This error is particularly understandable in view of the steps ordinarily involved, i.e. visually reading an instrument mounted on each equipment item, transcribing the values so read along with the identification of each particular equipment item, and transcribing columns of such information onto punched cards. In addition, computation of a net elapsed time for each item, if this is not done by machine, introduces the possibility of additional error. Until now, no way has been known to completely avoid operator-introduced error in compiling elapsed time records.

SUMMARY OF THE INVENTION

According to the present invention, an elapsed time compiling system is described which is completely free of operator-introduced error and which is compatible with coulometric elapsed time indicators. The compiling system utilizes elapsed time monitors, each of which includes a coulometric or other elapsed time indicator and an identification memory (IM) for uniquely identifying the equipment item which it monitors. A compiler is provided which includes means for sequentially reading each elapsed time monitor and for recording the information so read on a storage medium such as magnetic tape.

In a preferred embodiment of the invention the coulometer being read is reset to zero during the reading, thereby avoiding the possibility of error due to reading the same monitor twice. In one embodiment of the invention, the analog output of the monitor is converted to digital form for storage on magnetic tape, thereby minimizing the computation time required to process the data after compilation.

In a further embodiment of the invention, particularly suitable in the case of coulometers without non-destructive readout capability a coulometer is provided within the compiler for resetting the monitor coulometer to its initial value, thereby effecting non-destructive readout. One embodiment of the invention incorporates a monitor having a coulometer capable of non-destructive electrical readout for achieving virtually instantaneous readout of each monitor.

The IM in each monitor may include a uniquely connected set of connector pins in a multi-pin electrical connector, a resistor of a unique value associated with the particular equipment item, or any other similar uniquely identifiable signal source.

DESCRIPTION OF THE DRAWINGS

The invention will be further described in conjunction with the accompanying drawings, in which:

FIG. 3 is a block diagram of an embodiment of the invention for providing non-destructive readout capability for monitors having coulometers without inherent non-destructive readout capability.

DESCRIPTION OF THE PREFERRED EMBODIMENTS

Figure 1:
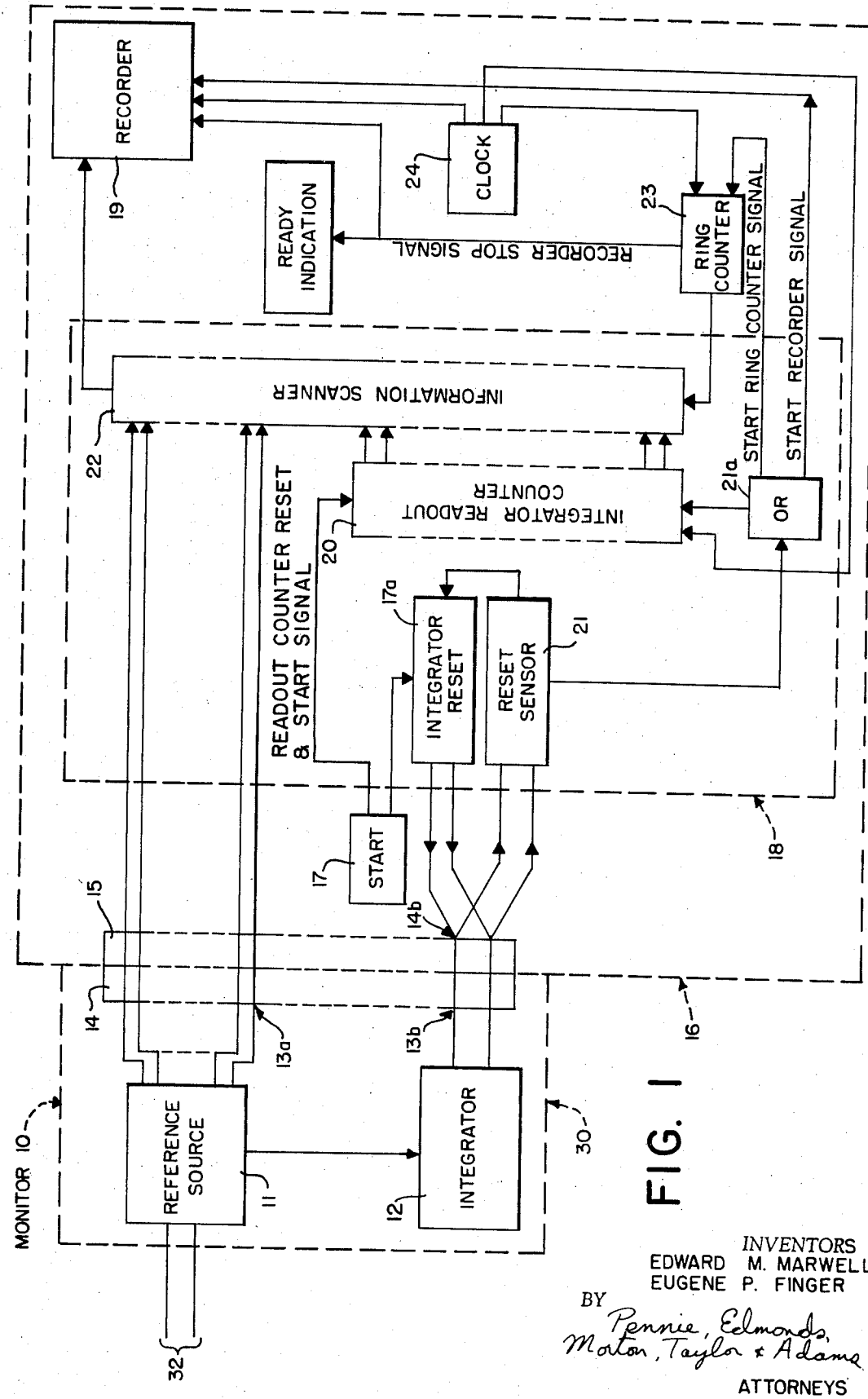
FIG. 1 is a block diagram of an embodiment of the invention.

FIG. 1 shows an embodiment of the invention in which the reading of a monitor 10 is performed in conjunction with the resetting of the monitor to zero. Monitor 10 includes a reference source 11 which may be any source of constant reference current. Reference source 11 is connected to an integrator 12, the output signal of which is proportional to the time integral of the reference current. Integrator 12 may advantageously be a coulometer, preferably of the type exhibiting a substantial impedance rise at its output terminals when it is fully reset (i.e. the electrolyte is displaced as far as it can go toward one end of the electrode column). Reference source 11 is connected to predetermined ones of pins 13a of a multi-pin electrical connector 14, the particular pins connected corresponding uniquely to the equipment item to which the particular monitor is connected. Each additional monitor in the set thereof corresponding to a given set of equipment items to be monitored preferably has a different set of pins or contacts connected to its associated reference source, so that the total number of equipment items which may be monitored by a particular system is $2^n$, wherein $n$ is equal to the number of connector pins 13a available for use as identification pins.

In addition to pins 13a, connector 14 carries contacts 13b for integrator 12. The connector 14 carrying pins 13 mates with a corresponding connector 15 which is preferably mounted on a probe or flexible cord connected to the compiler unit generally indicated in FIG. 1 as 16.

Generally, in accumulating data from numerous monitors 10 associated with respective equipment items, connector 15 is plugged into connector 14 and START switch 17 (preferably a push-button) is actuated. In the ensuing operation cycle the identification code stored in the IM (constituted by the particular distribution of pins 13a connected to reference source 11) as well as the value of the integral stored in integrator 12 are read into an intermediate memory 18. From intermediate memory 18, the information is transferred to a recorder 19 where it is stored for subsequent transfer to a computer.

More specifically, actuation of START switch 17 resets to zero and sets in operation integrator read-out counter 20, which may be any conventional fixed rate counter. Simultaneously, START switch 17 connects an integrator reset current source 17a having an output current I to terminals 14b of connector 14 to reset integrator 12 to zero. The ratio of the reset current I to the current i supplied by reference source 11 is equal to the ratio of the time scale of the integration performed by monitor 10 to the time scale of the read-out operation. In other words, if for example the ratio $I/i$ is made equal to 100, then reading the integrator takes $\frac{1}{100}$ of the operating time stored in the integrator for the particular equipment item. In this way, the read-out time can be made as small as is desired by making the ratio $I/i$ sufficiently high, within the limitations of integrator 12.

As a practical matter, with respect to currently available coulometric indicators, the ratio $I/i$ is on the order of 60,000. Thus a coulometer which has a capacity of 1,000 hrs. requires at most one minute for readout by the embodiment of FIG. 1.

When integrator 12 has been fully reset, a change in its output characteristics, for example, a sudden impedance rise exhibited by certain types of coulometric device is sensed by reset sensor 21, which immediately signals integrator read-out counter 20 to cease counting. The digital count thus accumulated during reset of integrator 12 corresponds to the value of the integral which was stored therein. Reset sensor 21 (which may be any electrical device capable of sensing the change in output characteristics of the integrator, such as an impedance-sensitive switch) also stops the integrator reset operation by turning off the current I being supplied to the integrator by source 17a.

The output of integrator read-out counter 20 is connected in parallel, along with the output from the IM formed by contacts 13a, to information scanner 22, which is a parallel-to-serial converter. At the same time that reset sensor 21 signals the integrator read-out counter 20 to cease counting, it signals and thereby starts ring counter 23, cycling it through a full count. During the cycle, ring counter 23 (which steps at a rate determined by pulses from clock 24) cases information scanner 22 to convert the binary parallel information at its input into serial form and records it on magnetic tape in recorder 19, which is actuated by a signal from reset sensor 21 through OR gate 21a. When ring counter 23 completes its cycle, it signals recorder 19 to stop and indicates the same to the operator by way of ready indicator 19a which may be a light bulb or any similar convenient signaling device. Note that clock 24 provides timing pulses for the recorder and the integrator read-out counter as well as for ring counter 23. In the event that the particular recorder 19 used requires a finite time for acceleration to recording speed, any conventional time delay element may be provided ahead of the ring counter in the path of the start signal for delaying the counting cycle by the required amount. Upon completion of the cycle it will thus be seen that a signal which uniquely identifies monitor 10 along with the elapsed time measurement stored in monitor 10 have been converted to serial binary form and stored on magnetic tape in recorder 19. At the same time, integrator 12 in monitor 10 has been reset to zero, so that any subsequent reading of monitor 10 cannot inadvertently count the same elapsed time as has already been read.

This embodiment of the invention provides still a further advantage compared to previously employed information collection systems. In reading a coulometer-type meter on a equipment item, the operator previously had to subtract, from the current reading, the previous non-zero reading in order to ascertain the elapsed time between readings. By automatically resetting the integrator to zero during each reading no residual integral is left which need be subtracted from the subsequent reading. The above-described embodiment of the invention is particularly suited for use with coulometric integrators incapable of non-destructive readout.

Figure 2:
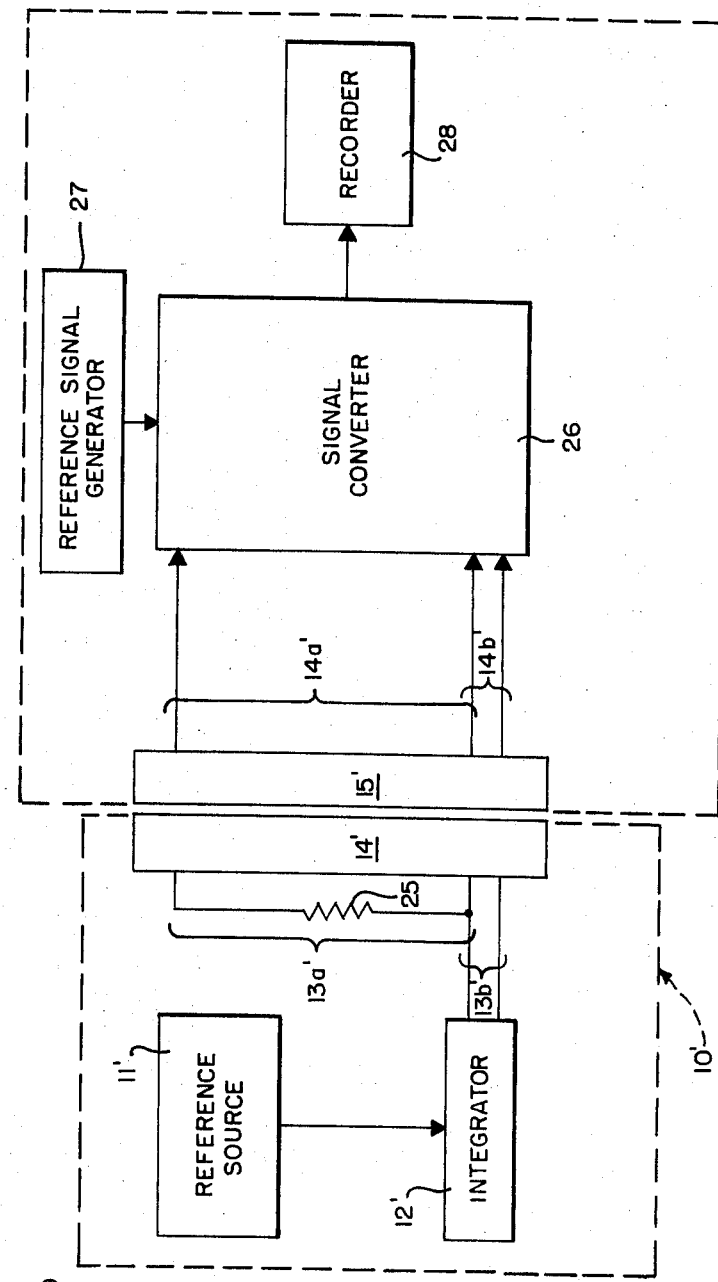
FIG. 2 is a block diagram of an embodiment of the invention wherein an analog output signal is provided.

FIG. 2 illustrates an embodiment of the invention suitable with integrators having non-destructive readout capability, in which a monitor 10' similar to monitor 10 in FIG. 1 is employed. Read-out is virtually instantaneous in this embodiment, and does not reset integrator 12' to zero. Monitor 10' in FIG. 2 includes a reference source 11' connected to a coulometer-type integrator 12'. A resistor 25 is connected between two pins 13a' of a connector 14', and the terminals of integrator 12' are connected to contacts 13b of connector 14'. Connector 15', which forms part of the compiling unit, contains terminals 14a' and 14b' corresponding respectively to terminals 13a' and 13b'. Connector 15' is connected to signal converter unit 26 which converts (a) the resistance of resistor 25 and (b) the output signal from integrator 12' into signals capable of being recorded directly on magnetic tape. In this embodiment, integrator 12' may be of the coulometric type described in U.S. Pat. No. 3,255,413, issued June 7, 1966, wherein the integrator provides an electrical output corresponding to the value of the integral stored in it, instead of (or in addition to) a visual read-out. Alternatively, this type of coulometer exhibits a capacitance at its output terminals dependent on the integral stored in it, and the value of this capacitance may thus be conveniently read by connecting it in an oscillator circuit to generate an FM signal representative of the stored integral. Such FM signal may be recorded directly on magnetic tape, along with the reference signal, thereby avoiding the necessity for those elements of converter 26 which are otherwise required to provide the proper recording waveform. A reference signal generator 27 is connected to the signal converter to provide a reference signal of known amplitude and frequency, which is recorded on magnetic tape in recorder 28 in order to compensate for any error introduced into the system, particularly in the recorder itself. Any variation in tape speed within the recorder which introduces error is thus known by virtue of its effect on the waveform of the reference signal, so that any such effect may be compensated for in processing the identification and integrator output signals when they are later read out of recorder 28.

The value of resistor 25 is recorded by connecting a predetermined voltage (provided from within the signal converter) across terminals 14a', whereby the output current corresponds to the particular resistance value.

The conversion performed by signal converter 26 is conversion from the D.C. signal produced by integrator 12' to an A.C. signal suitable for recording on magnetic tape. The above-described embodiment has the advantage that the digital conversion necessary for routine computer processing of the recorded data may be performed by existing data processing equipment without the necessity of providing additional converting equipment in the compiler unit. Adequate measurement accuracy is achieved by providing a reference signal, generated by reference signal source 27, so that any system error may be detected and compensated for. The embodiment of FIG. 2 is most advantageous for applications requiring high-capacity integrators, for the storage of many thousands of hours of equipment usage in each equipment item ordinarily precludes interrogation of each monitor in less than several minutes with, for example, the embodiment of FIG. 1. The interrogation time for this embodiment, in contrast, is on the order of milliseconds.

FIG. 3 is a block diagram of an embodiment of the invention particularly suitable for applications in which the integrator is incapable of non-destructive read-out, in which non-destructive read-out capability is nevertheless desired. The embodiment shown in FIG. 3 is the same as that of FIG. 1, except that a coulometric integrator 36 is connected in series with the source 17a of current I in intermediate storage unit 18' so that the current I resetting integrator 34 in monitor 35 also passes through a second integrator 36 within the complier unit. FIG. 3, monitor 35 may be identical to monitor 10 of FIG. 1. Intermediate storage 18' may be the same as intermediate storage 18 of FIG. 1, and except as otherwise shown the remaining structure of FIG. 3 may be the same as that of FIG. 1.

Depression of START switch 37 initiates a read cycle of the complier unit of FIG. 3, as described in conjunction with FIG. 1. The reset current I from integrator reset unit 17a resetting integrator 34 at the same time establishes an integral in integrator 36 of the same value as that initially stored in integrator 34. Upon actuation of reset sensor 21, integrator reset source 17a is turned off and an integrator restore unit 44 (preferably a constant current source like integrator reset unit 17a) is actuated to signal integrator 36 to reset it to zero by transferring its contents back to integrator 34. The integrator restore unit is subsequently turned off by reset sensor 38, similar to reset sensor 21 which senses when integrator 36 has been reset to zero, and hence when integrator 34 has been restored to its initial value. At such time, the current I through integrator 36 is turned off like ring counter 21 (FIG. 1), ring counter 43 signals recorder 39 to stop upon completion of a full count cycle. In addition since it may take longer to restore the contents of integrator 34 than to write the value of its integral in recorder 39, and AND gate 40 is provided for actuating ready indicator 41 only upon completion of both functions. Clock 42 and ring counter 43 may be identical to the clock and ring counter 24 and 23 of FIG. 1.

Although this embodiment of the invention is capable of providing non-destructive read-out capability in a monitor which does not inherently have such capability, it requires twice the time for a read-out cycle as does the embodiment of FIG. 1. Thus a complete read-out cycle, assuming that integrator 34 has a capacity of 500 hours, requires a full minute.

Figure 4:
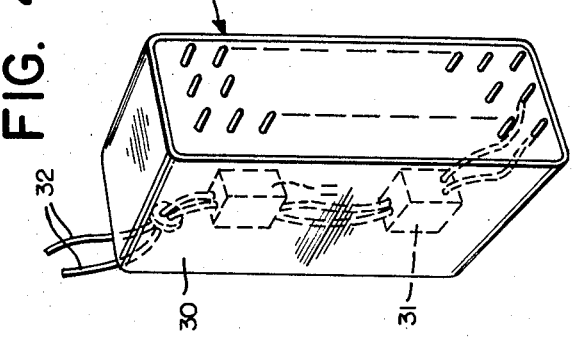
FIG. 4 is a perspective view of a monitor in accordance with the invention for monitoring a particular equipment item.

FIG. 4 is a perspective view of a monitor in accordance with the present invention, including a multi-pin electrical connector 29 having a housing 30 within which is mounted an integrator 31. A pair of conductors 32 extends through housing 30 to an internal reference source 11, such as a battery, which supplies current to integrator 31 during the time it is controlled by the signal on conductors 32 to do so. Conductors 32 supply current to actuate the internal source 11 during the time the equipment item is in use. Integrator 31 is connected to two of the pin electrodes of connector 29, the remaining pin electrodes being available for energization of the voltage provided on conductors 32 as an IM, to denote the specific connector 29. In the embodiment shown, there are 28 pins available to constitute the IM which identifies the connector, so that a total of $2^{28}$ equipment items may be monitored with the set of connectors 29.

It will be apparent to those skilled in the art that various modifications of the above-described embodiments may be made without departing from the scope of the invention, which is limited only in accordance with the following claims.

We claim:

1. A portable compact elapsed time compiling system for recording the activity of a plurality of equipment items without fixed connection to such equipment items and substantially without the introduction of operator error, comprising:
   (a) an elapsed time monitor corresponding to each such equipment item having a coulometric integrator for providing an output signal representative of the time integral of the rate of use of such equipment item, and an identification memory for providing an identification signal for uniquely identifying such equipment item to which it corresponds;
   (b) a portable, self-contained compiler unit connectable to the elapsed time monitor but which is normally physically and electrically disconnected from the compilers of such equipment items for reading and storing the output signal and corresponding identification signal from each elapsed time monitor including an intermediate memory for storing such output signal and identification signal and means connected to the intermediate memory for converting said output and identification signals to a form suitable for permanent storage; and
   (c) a permanent storage unit for storing signals received from the converting means.

2. An elapsed time compiling system as defined in claim 1 wherein said intermediate memory includes a source of current for resetting said coulometric integrator to zero, timing means for measuring the length of time required to reset said integrator to zero, and control means for controlling said current source and timing means to generate an output signal representative of the integral stored in said coulometric integrator.

3. An elapsed time compiling system as defined in claim 1 for use with an elapsed time monitor having a coulometric integrator capable of non-destructive read-out, wherein said intermediate memory includes means for converting the output and identification signals to a form suitable for permanent storage, and a source of reference signal of known characteristics; said permanent storage means being connected to record the reference signal along with the output and identification signals.

4. An elapsed time compiling system as defined in claim 1 wherein said identification memory comprises a group of electrical contacts, predetermined ones of which are connected to a signal source.

5. An elapsed time compiling system as defined in claim 1 wherein said identification memory is a resistor, the resistance of which identifies the equipment item monitored by the monitor containing such identification memory.

6. A portable compact elapsed time compiling system for recording the activity of a plurality of equipment items without fixed connections to such equipment items and substantially without the introduction of operator error, comprising:
   (a) an elapsed time monitor corresponding to each such equipment item having an integrator for providing an output signal representative of the time integral of the rate of use of such equipment item, and an identification memory for providing an identification signal for uniquely identifying the equipment item to which it corresponds;
   (b) a portable self-contained compiler unit connectable to the elapsed time monitor of each equipment item but which is otherwise normally physically and electrically disconnected from such equipment items, for reading and storing the output signal and corresponding identification signal from each elapsed time monitor, including an intermediate memory for storing such output and identification signals, means connected to the intermediate memory for converting said output and identification signals to a form suitable for permanent storage; and (c) a permanent storage unit for storing signals received from the converting means, said intermediate memory including a source of current for resetting said integrator to zero and having timing means for measuring the length of time required to reset said integrator to zero, and control means for controlling said current source and timing means to generate an output signal representative of the integral stored in said integrator.

7. An elapsed time compiling system for recording the activity of a plurality of equipment items substantially without the introduction of operator error, comprising:

(a) an elapsed time monitor corresponding to each such equipment item having a coulometric integrator for providing an output signal representative of the time integral of the rate of use of such equipment item, and an identification memory for providing an identification signal for uniquely identifying such equipment item to which it corresponds;

(b) a compiler for reading and storing the output signal and corresponding identification signal from each elapsed time monitor, including an intermediate memory for storing such output signal and identification signal and means connected to the intermediate memory for converting said output and identification signals to a form suitable for permanent storage, and a permanent storage unit for storing signals received from the converting means, said intermediate memory including a source of current for resetting said coulometric integrator to zero, timing means for measuring the length of time required to reset said integrator to zero, and control means for controlling said current source and timing means to generate an output signal representative of the integral stored in said coulometric integrator, and said system including a second integrator connected in series with the current source for storing the value being read out of said coulometric integrator, said control means including means responsive to the resetting of the coulometric integrator for resetting said second integrator to zero.

8. An elapsed time compiling system for recording the activity of a plurality of equipment items substantially without the introduction of operator error, comprising:

(a) an elapsed time monitor corresponding to each such equipment item having an integrator for providing an output signal representative of the time integral of the rate of use of such equipment item, and an identification memory for providing an identification signal for uniquely identifying such equipment to which it corresponds;

(b) a compiler for reading and storing the output signal and corresponding identification signal from each elapsed time monitor, including an intermediate memory for storing such output signal and identification signal, means connected to the intermediate memory for converting said output and identification signals to a form suitable for permanent storage, and a permanent storage unit for storing signal received from the converting means, said intermediate memory including a source of current for resetting said integrator to zero, and having timing means for measuring the length of time required to reset said integrator to zero, and control means for controlling said current source and timing means to generate an output signal representative of the integral stored in said integrator; said system including a second integrator connected in series with current source for storing the value being read out of said integrator, said control means including means responsive to the resetting of the integrator for resetting said second integrator to zero.

References Cited

UNITED STATES PATENTS

| | | | |
|---|---|---|---|
| 3,045,178 | 7/1962 | Corrsin | 324—182 |
| 3,229,201 | 1/1966 | Curtis et al. | 324—189 X |
| 3,255,413 | 6/1966 | Marwell et al. | 324—182 X |
| 3,114,900 | 12/1963 | Anderson | 235—151.31 X |
| 3,351,910 | 11/1967 | Miller et al. | 235—151.31 X |

ALFRED E. SMITH, Primary Examiner

U.S. Cl. X.R.

324—189